United States Patent [19]

Lee et al.

[11] 4,083,480

[45] Apr. 11, 1978

[54] STABILIZING APPARATUS FOR BODY-CARRIED EQUIPMENT

[75] Inventors: Kenneth K. Lee, Los Altos; Albert W. Martin, Santa Clara, both of Calif.

[73] Assignee: Ampex Corporation, Redwood City, Calif.

[21] Appl. No.: 668,523

[22] Filed: Mar. 19, 1976

[51] Int. Cl.² ............................................. G03B 17/00
[52] U.S. Cl. ..................................... 224/5 V; 350/72; 352/243; 354/293
[58] Field of Search .................... 224/5 A, 5 B, 5 BC, 224/5 H, 5 P, 5 R, 5 V, 25 A, 25 R; 240/59; 354/293, 294, 295, 296, 82; 325/111, 118; 350/72, 248, 298; 248/432; 352/243

[56] References Cited

U.S. PATENT DOCUMENTS

| 1,118,640 | 11/1914 | Dreyfoos | 354/296 |
|---|---|---|---|
| 2,640,111 | 5/1953 | Samsky et al. | 179/157 |
| 2,806,416 | 9/1957 | Jones, Jr. | 224/45 R |
| 2,873,645 | 2/1959 | Horton | 354/82 X |
| 3,002,663 | 10/1961 | Fernelius | 354/82 X |
| 3,490,833 | 1/1970 | Gottschalk et al. | 352/243 |
| 3,767,095 | 10/1973 | Jones | 224/5 V |
| 4,017,168 | 4/1977 | Brown | 354/82 |
| 4,037,763 | 7/1977 | Turchen | 224/5 V |

FOREIGN PATENT DOCUMENTS

| 1,018,108 | 12/1952 | France | 354/293 |
|---|---|---|---|
| 943,046 | 11/1963 | United Kingdom | 354/293 |

*Primary Examiner*—Drayton E. Hoffman
*Assistant Examiner*—Carl Rowold
*Attorney, Agent, or Firm*—Charles M. Carman, Jr.

[57] ABSTRACT

Body-carried equipment, such as a television camera, is supported on a mount that engages the body at a first level, such as the shoulder; and the mount has a forwardly extending "panning" arm for directional control. From the forward end of the arm, an adjustable brace assembly extends (e.g., downwardly) to engage the body at a second level (e.g., waist level) spaced vertically from the first level. Adjustments are provided for elevational angle, tilt and forward-rearward balance of the equipment (camera).

7 Claims, 7 Drawing Figures

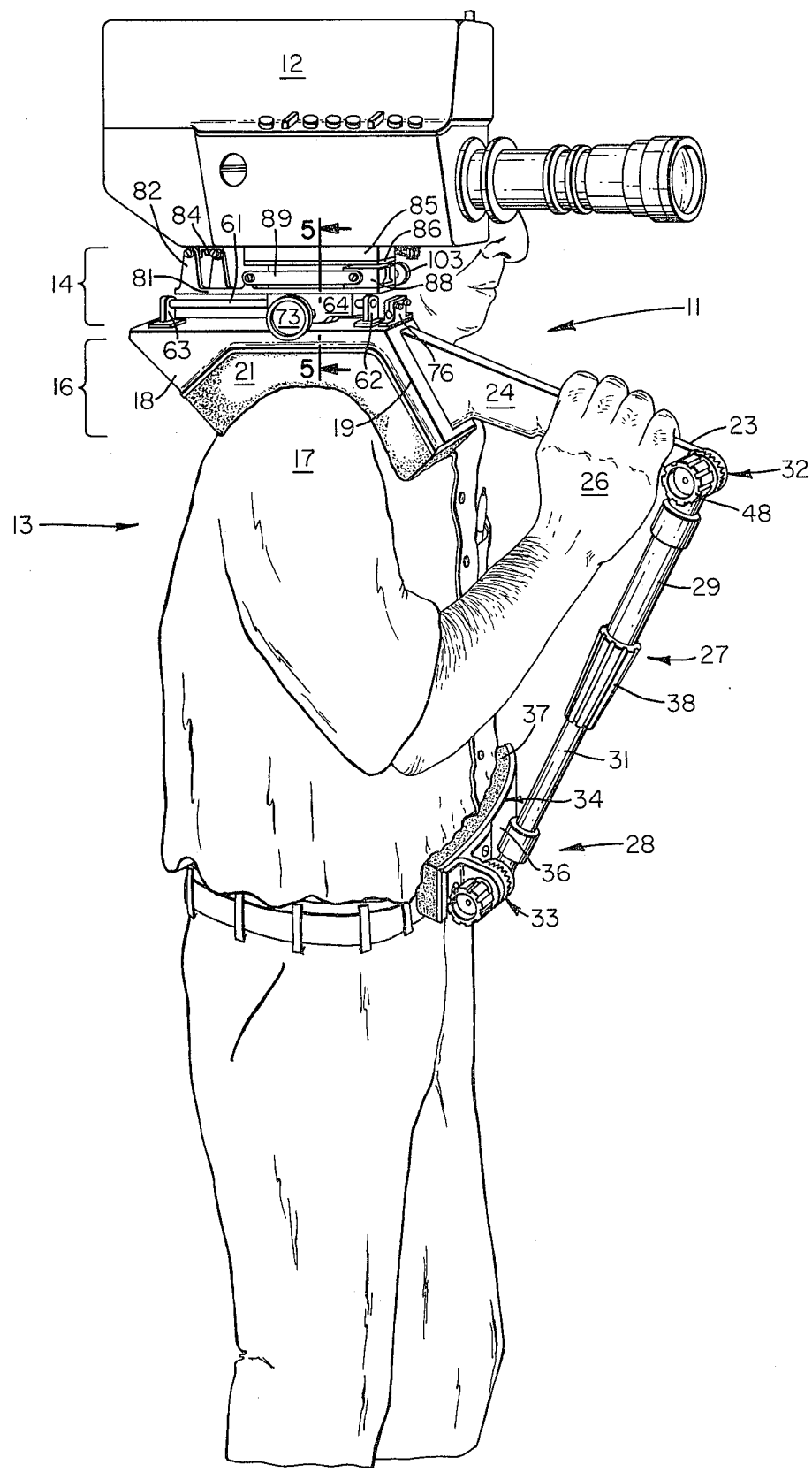
FIG_1

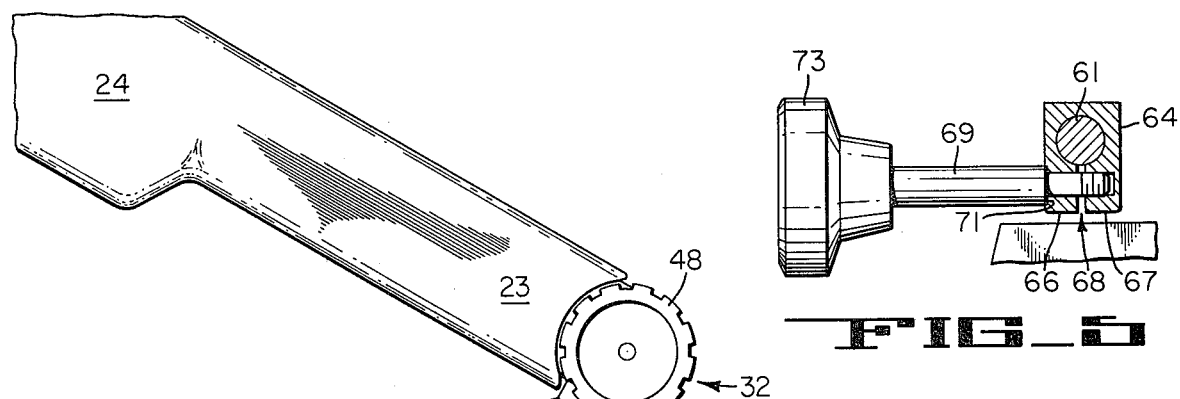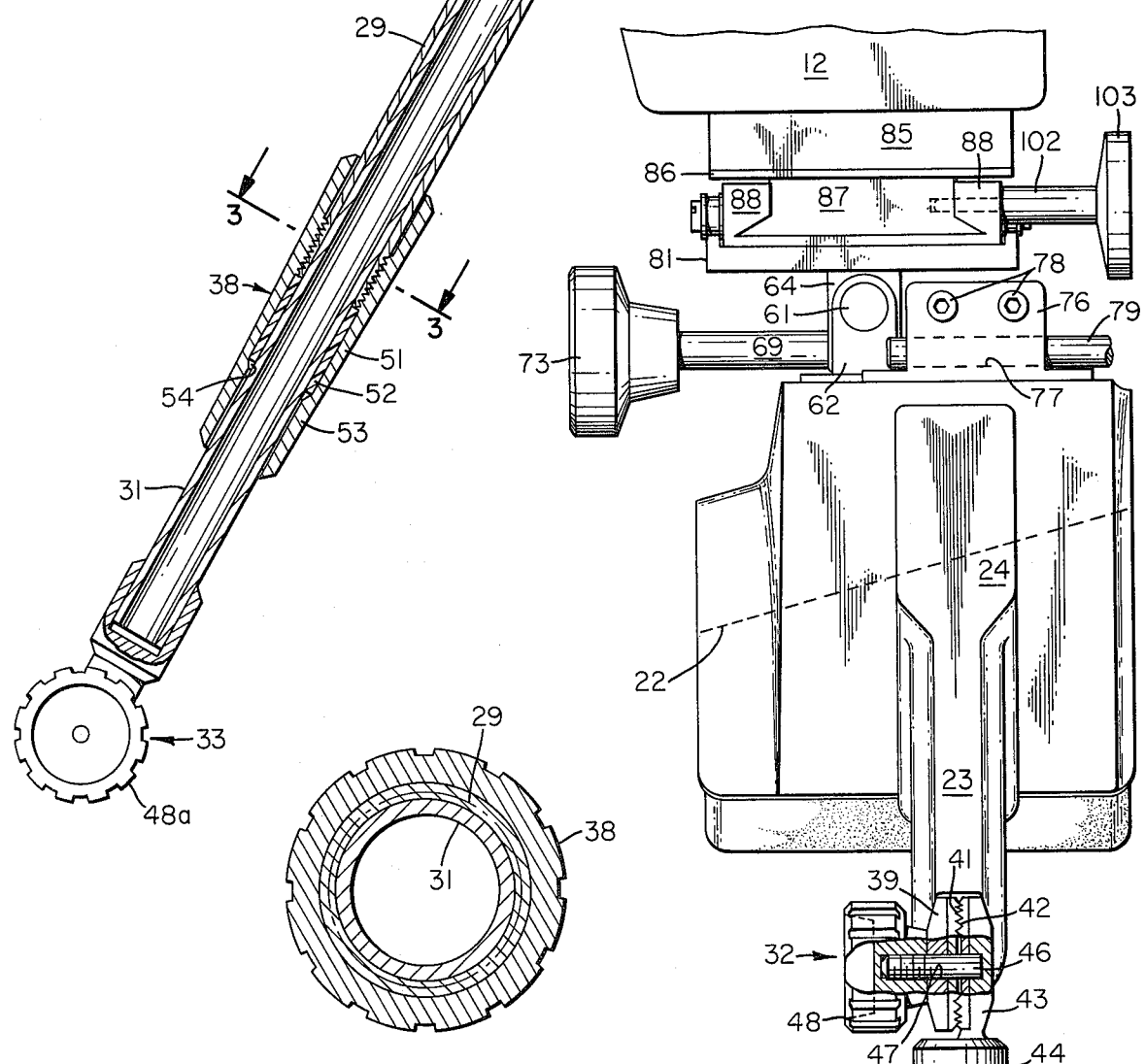

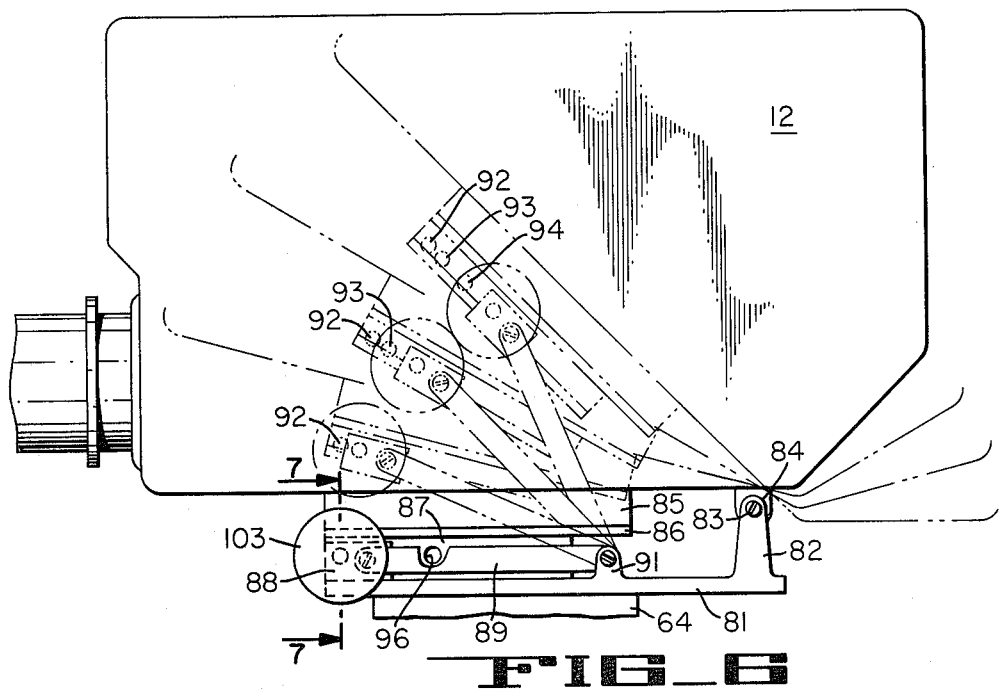
FIG_6
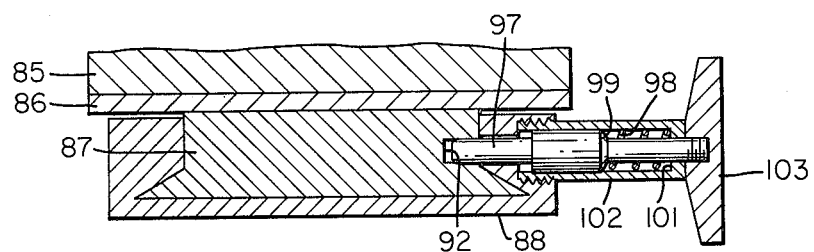
FIG_7

STABILIZING APPARATUS FOR BODY-CARRIED EQUIPMENT

BACKGROUND OF THE INVENTION

This invention relates to stabilizing apparatus for body-carried equipment, and particularly to such apparatus providing stable directional control.

In the art, and particularly that relating to cameras such as motion picture and television cameras that are body-mounted for mobility in the photographing of news and sporting events, there have arisen a number of control problems deriving from the weight and size of the cameras. Such cameras may weigh from ten to twenty pounds and may require as well the mounting of complex electronic circuitry in a back-pack or other carrying means upon the body of the operator; the total body loads can reach values of thirty to forty pounds. Under such circumstances, the bracing and slinging of the camera itself, for agile operation and for minimizing operator fatigue, becomes a demanding objective.

Previously, the art has provided shoulder braces of the gun-stock type for attachment to the rear of a compartatively light-weight camera, and adaptations of such a mount to include a vertical brace extending from the rear of the gun-stock downwardly to fasten to a belt encircling the waist of the operator. However, such mounts have been found generally deficient for the heavier cameras that come increasingly into use, in that insufficient provision is made for adjusting the balance of the cameras mass and retaining directional control without fatiguing the operator.

Accordingly, it is an object of the present invention to provide a stabilizing apparatus for body-mounted equipment that effectively maximizes control of the equipment and minimizes operator fatigue regardless of the weight of the equipment.

BRIEF DESCRIPTION OF THE INVENTION

This and other objects are attained by means of an arrangement in which body-carried equipment, such as a television camera, is supported on a mount that engages the body at a first level, such as the shoulder; and the mount has a forwardly extending "panning" arm for directional control. From the forward end of the arm, and adjustable brace extends (e.g., downwardly) to engage the body at a second level (e.g., waist level) spaced vertically from the first level. Adjustments are provided for elevational angle, tilt and forward-rearward balance of the equipment (camera).

DESCRIPTION OF THE DRAWINGS

FIG. 1 is a left side and front elevational perspective view of a stabilizing apparatus incorporating the invention for use in, for example, supporting camera equipment carried on the body of a cameraman;

FIG. 2 is a left side elevational view partly fragmented and in section, and to an enlarged scale, of a portion of the stabilizing apparatus shown in FIG. 1;

FIG. 3 is a cross-sectional view, to a further enlarged scale, taken substantially on the plane of line 3—3 of FIG. 2;

FIG. 4 is a front elevational view, partly fragmented and in section, and to an enlarged scale, of a portion of the stabilizing apparatus shown in FIG. 1;

FIG. 5 is a front elevational view, to an enlarged scale and substantially in cross-section, taken substantially along the plane of line 5—5 of FIG. 1;

FIG. 6 is a right side elevational view to an enlarged scale partly broken away and partly in phantom, of a portion of the apparatus shown in FIG. 1; and FIG. 7 is a cross-sectional view, to an enlarged scale, taken substantially along the plane of line 7—7 of FIG. 6.

DESCRIPTION OF THE PREFERRED EMBODIMENTS

Referring now to FIG. 1, there is shown a stabilizing apparatus 11 for equipment, such as a television camera 12, carried on the body 13 of a person, e.g., a cameraman. The apparatus 13 includes a means 14 for engaging and supporting the camera 12; and a portion of means 14, namely a shoulder-mount 16, is adapted to engage the body 13 at a first or shoulder 17 level thereof. To maintain the load of the camera securely during movement of the cameraman, the mount 16 has a generally inverted U of saddle shape with rigid down-turned rear and forward portions 18 and 19, respectively; and a shoulder pad 21, formed for example of resilient foam-rubber, is securely attached to the bottom side of the rigid portion of the mount 16, including portions 18 and 19. In addition, the saddle portion of mount 16 has an internal lateral slope conforming generally to the normal shoulder slope of a cameraman, as indicated by the dashed line 22 in FIG. 4.

To give the mount and its load directional stability, the means 14 has a portion 23 spaced substantially forwardly from the body 13. In the illustrated embodiment (FIG. 1), this portion 23 includes a handhold formed on an arm 24 that would be termed a "panning-arm" or "pan-handle" in the camera art. The arm 24 extends forwardly and slightly downwardly from the rigid portion of the shoulder-mount 16, so that the position of the hand 26 of the cameraman is at about shoulder level, with the arm semi-flexed, that is, in a condition intermediate between fully-flexed and fully-extended. It will be understood that in this position the cameraman has maximum control of the direction of the camera 12, with least fatigue to the hand and arm. If the cameramen desires, for example, to change the direction of the camera, or to sweep from left to right or from right to left in a "panning" motion, he needs only to turn his body and to concurrently sweep the arm 24 in the desired direction, and the camera will follow the motion, despite its mass. The arm 24 is useful also in manually controlling the balance of the mass of the camera and in changing or controlling its angle of elevation, especially when used without or independently of the bracing means 27 to be described below.

It will be understood that continuous manual support of the panning arm 24 can be overly tiring to the arm, with the practical result of reducing the accuracy or facility of control. Accordingly, a bracing means 27 is provided, extending from the forwardly spaced portion 23 of arm 24 and engaging the body 13 at a second or waist level 28, this being a level that is spaced vertically from the first or shoulder level 17. The means 27 comprises a main brace member 29 having associated therewith a telescoping brace member 31 for adjustment to the proportions of the individual cameraman. A first toothed clamp 32 is provided to attach the member 29 to the arm 24, and a second toothed clamp 33 is provided to attach the member 31 to a body-engaging waist mount 34, consisting of a rigid shoe 36 and resilient (e.g., foam rubber) pad 37 both curved to conform to the body shape and offset to cover the body mid-portion when the mount 16 is carried on the shoulder. By means of the clamps 32, 33 the precise angle of the brace means 27 can be set to the requirements of the individual cameraman; and a third adjustment in rotation is possible through the agency of a sliding-rotating clamp 38 for the members 29, 31, more fully described below.

Referring now to FIGS. 2 through 4, the structures of the clamps 32, 33 and 38 are shown. Clamps 32, 33 are substantially similar, and the construction of clamp 32 alone will be described in detail. Extending from arm 24 is a disc-shaped portion 39 (FIG. 4) having radially aligned teeth 41 that mate with similar teeth 42 in a similar disc-shaped portion 43 that extends from a cap-shaped element 44 that is fitted over the end of and secured to the tubular brace member 29. A pin 46 is securely (e.g., press-fitted or welded) mounted at the axis of disc-shaped portion 43 and extends through a central hole 47 in disc-shaped portion 39; and a knurled hand-knob 48 is threaded on the end of pin 46. By loosening the knob 48 sufficiently, the teeth 41, 42 can be disengaged and member 29 can be rotated to a desired angular position with respect to arm 24, whereupon the knob 48 can be tightened, engaging the teeth 41, 42 and locking the member 29 and arm 24 into the chosen angular relationship. Clamp 33 has a similar construction, including a knob 48a, by which the angular relationship of brace member 31 and waist mount 34 can be chosen and set.

The telescoping and rotational adjustments of brace members 29 and 31 are shown in FIGS. 2 and 3. The member 31 is formed as a hollow tube snugly fitting within the hollow-tubular member 29 for both axial sliding and rotational motion. Threaded upon the end of member 29 is a tubular shaped and longitudinally knurled hand-grip 51. Also within the tubular hand-grip 51 and fitting slidably upon the member 31, is a compressible tubular clamping ring 52. The lower end of hand-grip 51 has a necked-down interior portion 53 defining a shoulder 54 closing around the lower end of clamping ring 52. The ring 52 is thus trapped between the lower end of tubular member 29 and the shoulder 54 of grip 51; and when the grip 51 is tightened on member 29, as by screwing it upwardly, the clamping ring is compressed longitudinally so as to expand radially and clamp the members frictionally together against both telescoping and rotational displacement. Nevertheless, adjustments may easily be made by slightly loosening the hand-grip 51 and then afterward retightening it.

In order to accommodate cameras of different mass distributions, so as to maintain the center of mass either directly over the shoulder or forwardly or rearwardly displaced, as desired, and to adjust the apparatus to differences in shoulder slope, the mount 16 carries a generally horizontal and forwardly-rearwardly oriented slider rod 61 (FIGS. 1, 4 and 5) held securely at the ends by brackets 62, 63. Upon rod 61 is slidably and rotably mounted a clamping element 64, the lower portion of which is centrally split parallel to the length of rod 61; and the two clamping halves 66, 67, flanking the split 68, are drawn clampingly together around the rod 61 by means of a bolt 69, having a shoulder 71 engaging the portions 66 and a portion 72 of reduced diameter passing freely through portion 66 in a conforming hole and threaded into portion 67. A hand-knob 73 is provided at the extending end of bolt 69.

Also shown extending upwardly from mount 16 is a split bracket 76 (FIGS. 1 and 4) which has a laterally extending bore 77 and a pair of clamping bolts 78, similar in operative construction to the bolt 69, for provisionally clamping and holding other attachments, such as the mounting shaft 79 of a view-finder (not shown).

To provide an adjustment in the elevational angle of the camera, a platform 81 is provided (FIGS. 1, 4 and 6) solidly attached to the top of element 64, and pivotally mounting the camera as by two pivot brackets 82 at the rear and a pivot pin 83 coupling the brackets 82 and a pivot bracket 84 extending from the bottom rear portion of the camera. The bottom forward portion of the camera has a block 85 integral therewith and extending therefrom, which block is attached to a plate 86 of the mount 14 as by means of screws (not shown). Extending below the plate 86 is a dove-tailing slider bearing member 87, which fits into the conforming shoe member 88 so that the shoe may slide forwardly or rearwardly on the bearing member 87. The shoe 88 is secured by means of two pivoting link arms 89 to a pair of pivot brackets 91 so that the shoe 88 is caused to slide on bearing 87 as the camera is pivoted up and down on brackets 82 as shown in FIG. 6. Three angular elevational settings are provided besides the horizontal, and for these settings four holes 92, 93, 94 and 96 are provided, into which fits a latch pin 97 extending from the shoe 88 and spring loaded as by means of a compression spring 98 extending between a shoulder 99 formed on the pin 97 and an interior shoulder 101 formed on an extending mounting tube 102 that is threaded into shor 88. A hand knob 103 is also provided for pull-push operation of the pin 97.

OPERATION OF THE INVENTION

Having attached the camera 12 to the plate 86 by means of screws (not shown), the operator then dons the back pack (not shown) containing batteries and other electronic gear, and then mounts the shoulder mount 16 upon his shoulder, adjusting the brace members 29, 31 and waist pad 34, by means of clamps 32, 33 and 38, to fit his body as shown in FIG. 1. The particular camera head 12 that is illustrated in FIG. 1, togehter with lens and view finder (not shown) weighs 15.2 pounds (6.89 kg.), and the back pack that goes with the camera weighs 17 pounds (7.71 kg.); thus, for ease of body balance, the operator will usually desire to set the camera mass considerably farther forward than is shown in FIG. 1, so that the camera weight is supported very substantially by the brace members 29, 31. He may therefore loosen knob 73 and slide the camera forward upon rod 61, simultaneously adjusting the lateral tilt of the camera to set it vertical in relation to the slope of his shoulder. Thus, the moment of the back pack, which urges the operator to tip rearwardly, is counterbalanced by the forward urging moment of the camera, instead of by fatiguing muscular reaction. Conversely, if the back pack is not to be used, the camera may be carefully balanced in the FIG. 1 position, and steadied by the hand on arm 24, which is necessary in any case to guide the mass in lateral turning, or "panning". In the illustrated balanced position, the arm muscles may be kept relaxed most of the time, for the weight of the arm alone is sufficient to restrain the the mass from tipping backward. Conversely, again, the camera mass may be balanced slightly more rearwardly or forwardly, so as to require greater muscular pull from the arm, or less, when the operator is required to bend his body forwardly or backwardly for extended periods, as for photographing a scene below or above his body level, or in descending or climbing hills. For adjustment of the camera for extended operation at high angles, of course, the adjustment may be made with knob 103 as shown in FIG. 6.

Likewise, if the operator desires, the brace structure 29, 31, 34 may be entirely removed as by unscrewing knob 48; and the camera may be steadied and "panned" by means of the hand alone on the arm 24. In such event, the adjustments enabled by knobs 73 and 103 are at least equally as useful as they are in conjunction with the use of brace means 29, 31, 34.

Thus, there has been described an apparatus by meand of which body-carried equipment, such as a television camera, is supported on a mount that engages the body at a first level, such as the shoulder; and the mount has a forwardly extending "panning" arm for directional control. From the forward end of the arm, an adjustable brace assembly extends (e.g., downwardly) to engage the body at a second level (e.g., waist level) spaced vertically from the first level. Adjustments are provided for elevational angle, tilt and forward-rearward balance of the equipment (camera).

We claim:

1. Stabilizing apparatus for body-carried equipment, comprising:
    a saddle mount for engaging the rearward, upper and forward portions of a shoulder of said carrier; and
    means for supporting said equipment in balanced condition above said shoulder mount, said last-named supporting means being supported by said saddle mount and being adjustable for movement of said equipment in a forward-rearward direction thereon to achieve said balanced condition of said equipment;
    a panning arm extending along an axis forwardly from said saddle mount and having a hand hold formed co-axially with said arm and adjacent the forwardly extending end thereof;
    said arm having a downward inclination substantially closer to the horizontal than to the vertical for the restful support of the carrier's arm and hand when relaxed with the fingers of said hand loosely grasping said hand hold; and
    a rigid brace extending downwardly and rearwardly from the forwardly extending end of said panning arm, for engaging the midsection of said carrier;
    said equipment supporting means having sufficient range is forward-rearward adjustment for balancing the combined masses of said equipment, said panning arm, and said brace with respect to said shoulder mount.

2. Stabilizing apparatus as recited in claim 1, wherein:
    said brace includes telescoping upper and lower segments and clamp means therefor;
    said brace upper segment having a first clamping swivel connection to said panning arm;
    said brace lower segment having a body engaging pad element coupled thereto by means of a second clamping swivel connection therebetween.

3. Stabilizing apparatus as recited in claim 1, wherein said supporting means includes:
    a generally horizontal rod extending in a forward-rearward direction and solidly mounted at both ends on and in parallel spaced relation above, said saddle mount;
    a clamping element slidably mounted on said rod and including means for releasably clamping said element to said rod; and
    means carried by said clamping element for attachment to said equipment.

4. Stabilizing apparatus as recited in claim 3, wherein said rod is of circular cross-section and said slidably mounted clamping element is also mounted for at least limited lateral rotation upon said rod for varying the angular lateral tilt of said equipment.

5. Stabilizing apparatus as recited in claim 3, wherein said supporting means also includes:
    hinge means carried on a rearward portion of said clamping element and attachable to said equipment for pivoting thereof to vary the angle of elevation thereof in a forward-rearwardly oriented vertical plane; and
    means for bracing said equipment at various angles of elevation in said forwardly-rearwardly oriented plane.

6. Stabilizing apparatus as recited in claim 5, wherein said last-named bracing means includes:
    a mounting element attachable to said equipment forwardly of the point of attachment of said hinge means thereto;
    a dove-tailing slider bearing member extending from said mounting element and carrying a conforming shoe member for sliding movement thereon in a generally forward-rearward direction;
    link arm means pivotably mounted by one end thereof on said clamping element forwardly of the point of attachment of said hinge means thereto;
    said link arm means also being pivotably attached by the other end thereof to said sliding shoe member to brace said equipment at said various angles of elevation thereof; and
    means for securing said shoe to said slider bearing member at each of said various angles of elevation.

7. Stabilizing apparatus as recited in claim 5, wherein said last-named securing means includes a detent pin mounted on said shoe and springloaded to protrude inwardly into any of a plurality of detent holes formed in said slider bearing member at positions of said shoe thereon corresponding to said various angles of elevation of said equipment.

* * * * *